US Patent Office 3,460,871
Patented Aug. 12, 1969

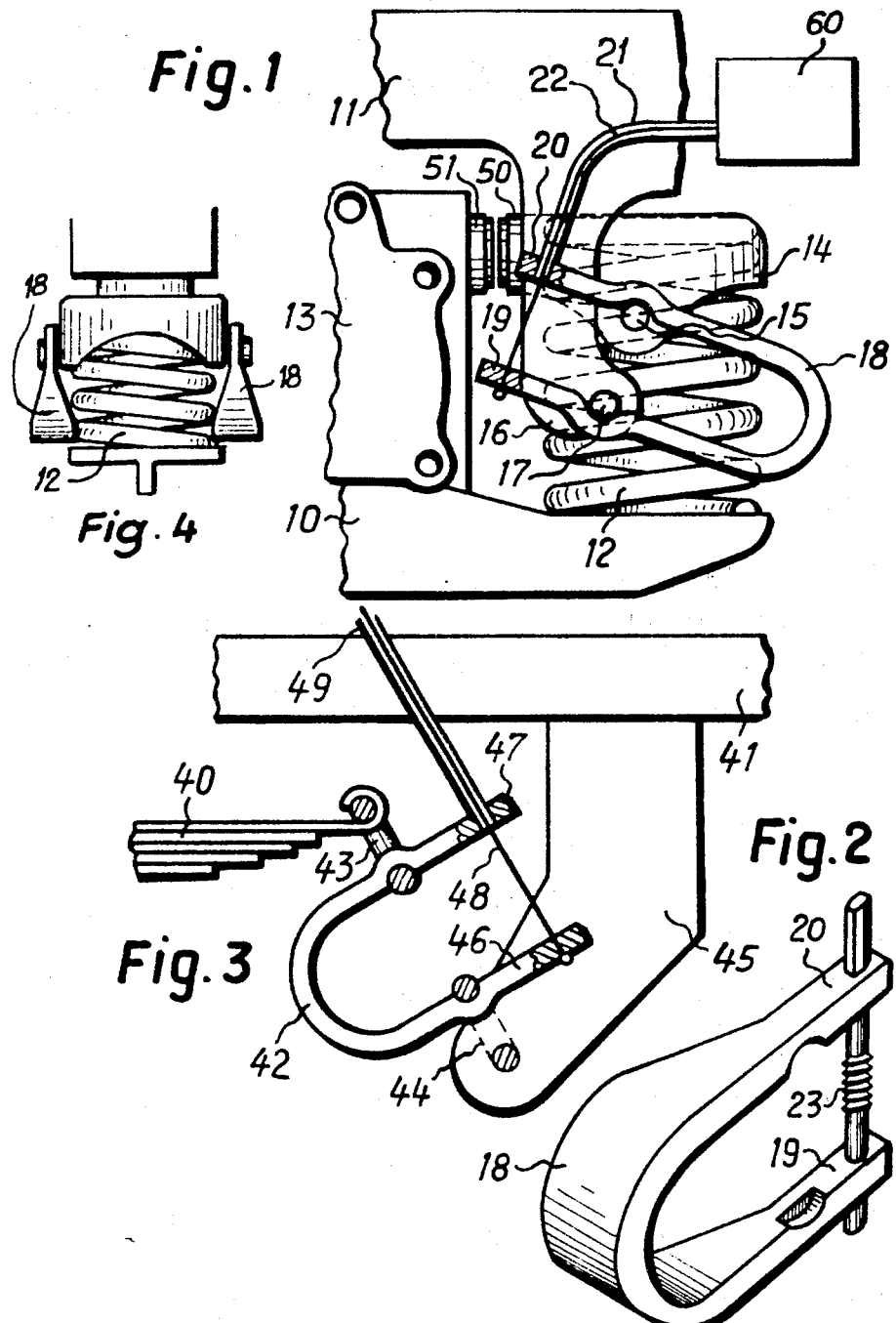

3,460,871
DEVICE FOR AUTOMATICALLY REGULATING THE BRAKE PRESSURE DEPENDING ON THE VEHICLE LOADING
Siegfried Keller, Effretikon, and Alfred Blaser, Rumlang, Switzerland, assignors to Werkzeugmaschinenfabrik Oerlikon Buhrle & Co., Zurich, Switzerland
Filed Mar. 29, 1968, Ser. No. 717,092
Claims priority, application Switzerland, Apr. 10, 1967, 5,042/67
Int. Cl. B60t 8/22
U.S. Cl. 303—22    5 Claims

ABSTRACT OF THE DISCLOSURE

A measuring spring which comprises two connection points is provided on a vehicle braked by compressed air, particularly a railway coach or wagon. The spacing between these connection points varies according to the loading of the vehicle. This variation is transmitted to a measuring member for the automatic regulation of the brake pressure. The measuring spring consists of a U-shaped leaf spring, one arm of which is articulated by means of the one connection point to one end of the vehicle spring and the other arm of which is articulated through the other connection point to a point on the upper portion of the vehicle which point is below the end of the vehicle spring.

---

The invention relates to a device for vehicles which are braked by compressed air, particularly railway rolling stock, for automatically regulating the brake pressure depending on the vehicle loading.

It is the object of the invention to provide such a device which does not require any great adaptation of the structural design of the vehicle for its attachment and which can be attached subsequently to a coach or wagon.

It is a further object of the invention to provide a device which measures the vehicle loading with simple but reliable means. This device should be independent of the characteristics of the vehicle spring.

It is a further object of the invention to provide a device having simple transmission means. The vehicle loading measured by a measuring spring is adapted to be transmitted through a cable with a cable sheath to a brake-pressure regulator.

It is a further object of the invention to provide a device which is as independent as possible of vibrations of the vehicle. Means are to be provided to damp such vibrations on travel of the measuring spring. Such means may comprise a friction plate and a friction surface, for example, which are displaced relatively to one another on travel of the measuring spring.

Two examples of embodiments of a device according to the invention are described in detail below with reference to the accompanying drawing in which:

FIGURE 1 shows a view of part of a railway bogie with a measuring spring in accordance with a first example of embodiment;

FIGURE 2 is a perspective illustration of the measuring spring in FIGURE 1;

FIGURE 3 shows the same as FIGURE 1 according to a second example of an embodiment; and FIGURE 4 is a side view of FIGURE 1.

According to FIGURE 1, a vehicle spring 12 is mounted between a girder 10 of the lower portion and a girder 11 of the upper portion of the bogie frame of a railway vehicle. This vehicle spring 12 bears against the girder 10 to which is secured an axle box 13 in which there is mounted the wheel axle, not visible in the figure. Mounted on the vehicle spring 12 is a spring cap 14 on which there is provided a pin 15. The girder 11 of the bogie frame comprises an extension 16 on which there is likewise provided a pin 17 which is situated below the pin 15. These two pins 15 and 17 are connected to one another through a U-shaped measuring spring 18 (FIGURE 2). A second such measuring spring 18, which is not illustrated in the drawing, is mounted at the rear of the vehicle spring 12. Mounted on the spring cap 14 is a second pin, which is not illustrated but which is connected, through this second measuring spring 18, to a further pin mounted on the girder 11 and likewise not illustrated. The weight of the coach or wagon is transmitted from the girder 11 through the two pins mounted on the girder 11, the two measuring springs 18, the two pins provided on the cap 14 and the cap 14 to the vehicle spring 12 and from this through girder 10 to the wheel axle. The two measuring springs 18 are forced open to a greater or lesser extent depending on the weight of the coach or wagon, the one measuring spring 18 comprises two extension arms 19 and 20 which do not participate in the deformation of the measuring spring 18. A flexible cable sheath 21 is secured to the upper extension arm 20 and a flexible cable 22 to the lower extension arm 19. The expansion of the measuring spring 18 can be transmitted through cable sheath 21 and cable 22 to a brake-cylinder pressure variator 60. The two extension arms 19 and 20 serve essentially to increase the utilisable travel during the expansion of the measuring spring.

A damping device is provided in order that no vibrations may be transmitted through cable 22 and cable sheath 21 to the pressure variator. This damping device comprises, as shown in FIGURE 1, a friction plate 50 which is secured to the spring cap 14 and co-operates with a friction surface 51 on the axle box 13. As can be seen from FIGURE 1, the two pins 15 and 17 are disposed obliquely one below the other as a result of which there is a component of force which tends to urge the friction plate 50 towards the friction surface 51. As a result, the weight of the coach or wagon is transmitted to the wheel axle through this damping member to a certain extent and fluttering of the measuring spring 18 is prevented.

According to FIGURE 2, the cable 22 (FIGURE 1) which is secured to the extension arm 19 of the measuring spring 18, is protected from soiling between the two extension arms 19 and 20 by a bellows 23.

The mode of operation of the device described is as follows: With empty goods wagons, the two measuring springs 18 are expanded only slightly because they are loaded exclusively by the dead load of the wagon. Thus the cable 22 projects relatively little from the cable sheath 21. The brake-cylinder pressure variator causes the brake pressure to be relatively low during braking. If the goods wagon is loaded, the measuring spring 18 expands because not only the dead load of the wagon but also the weight of the load is transmitted through the measuring spring 18 to the wheel axle. The expansion of the measuring spring is substantially proportional to the weight of the load. As a result of the expansion of the measuring spring 18, the cable 22 is displaced in the cable sheath 21 as a result of which the brake-cylinder pressure variator is set differently and a somewhat higher brake pressure is produced during braking than with an empty wagon. The brake pressure increases substantially in proportion to the weight of the load. The vibrations which occur during travel and which might cause fluttering of the measuring spring 18 are avoided by the damping device.

The advantage of this arrangement consists essentially in that the measuring spring 18 can be used subsequently on an existing wagon without structural modifications being necessary. With standardised wagons, the two pins 15 and 17 are connected together by a link. Now the measuring spring 18 is constructed in such a manner that it can simply replace the link.

According to FIGURE 3, a U-shaped leaf spring 42 serving as a measuring spring is mounted between a stack of leaf springs 40 and a girder 41 of the bogie frame of the railway wagon. Articulated to the stack of leaf springs 40 is a strap 43 against which there bears the measuring spring 42. The stack of leaf springs 40 bears against the wheel axle of the wagon in a manner not illustrated. An extension 45 is provided on the girder 41 and is supported on the measuring spring 42 through a strap 44. The weight of the wagon is transmitted from the girder 41 through extension 45, measuring spring 42 to the stack of leaf springs 40 and from this to the wheel axle. Depending on the weight of the wagon and of the load, the measuring spring 42 is expanded to a greater or lesser extent. The measuring spring 42 comprises two extension arms 46 and 47 which do not participate in the expansion of the measuring spring 42. A flexible cable sheath 49 is secured to the upper extension arm 47 and a flexible cable 48 to the lower extension arm 46. The expansion of the measuring spring 42 can be transmitted, through cable 48 and cable sheath 49, to a brake-cylinder pressure variator not illustrated. The two extension arms 46 and 47 serve essentially to increase the utilisable travel during the expansion of the measuring spring 42.

The mode of operation of this second form of construction corresponds entirely to the mode of operation of the first form of construction.

We claim:

1. A device for vehicles which are braked by compressed air, particularly railway rolling stock, for automatically regulating the brake pressure depending on the vehicle loading, having a lower portion of the vehicle, having a vehicle spring which rests on the lower portion of the vehicle and comprises an end, having an upper portion of the vehicle which comprises a point below said end of the vehicle spring, having a measuring spring which consists of a U-shaped, two-armed leaf spring and which comprises a connection point on each arm, of which connection points the one connection point is articulated to said end of the vehicle spring and the other connection point is articulated to said point on the upper portion of the vehicle, and having a measuring member which is connected to the measuring spring and measures a variation in the spacing between the two connection points caused by the loading of the vehicle.

2. A device as claimed in claim 1 having a brake-pressure regulator, having a cable sheath which is secured to one arm of the leaf spring, having a cable which is guided in the cable sheath and which is secured to the other arm of the leaf spring, cable and cable sheath transmitting said variation in the spacing of the two connection points to the brake-pressure regulator.

3. A device as claimed in claim 1 having means to damp said variation in the spacing between the two connection points.

4. A device as claimed in claim 1 having a friction plate and a friction surface bearing against said plate, which two form the damping means in that the friction plate is displaced relatively to the friction surface on variation in the spacing 5. A device as claimed in claim 1, having a second measuring spring which, together with said measuring spring, is disposed symmetrically with respect to the vehicle spring, which two measuring springs are connected to said point of the part of the vehicle situated below the end of the vehicle spring.

References Cited
UNITED STATES PATENTS 2,424,913    7/1947    Bruwall _____ 303—22 X MILTON BUCHLER, Primary Examiner J. J. McLAUGHLIN, Jr., Assistant Examiner U.S. Cl. X.R.

188—195; 267—1; 280—6